US009869170B2

(12) United States Patent
Nguyen et al.

(10) Patent No.: US 9,869,170 B2
(45) Date of Patent: Jan. 16, 2018

(54) METHODS OF CONTROLLING WATER PRODUCTION IN HORIZONTAL WELLS WITH MULTISTAGE FRACTURES

(71) Applicant: HALLIBURTON ENERGY SERVICES, INC., Houston, TX (US)

(72) Inventors: Philip D. Nguyen, Houston, TX (US); Vladimir Nikolayevich Martysevich, Spring, TX (US); Chandra Sekhar Palla-Venkata, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/659,750

(22) Filed: Mar. 17, 2015

(65) Prior Publication Data

US 2016/0273327 A1    Sep. 22, 2016

(51) Int. Cl.
*E21B 43/267*    (2006.01)
*C09K 8/80*    (2006.01)
*C09K 8/66*    (2006.01)

(52) U.S. Cl.
CPC ............ *E21B 43/267* (2013.01); *C09K 8/665* (2013.01); *C09K 8/80* (2013.01)

(58) Field of Classification Search
None
See application file for complete search history.

(56) References Cited

U.S. PATENT DOCUMENTS

| 6,476,169 | B1 | 11/2002 | Eoff et al. |
| 7,114,568 | B2 | 10/2006 | Eoff et al. |
| 7,117,942 | B2 | 10/2006 | Dalrymple et al. |
| 7,159,656 | B2 | 1/2007 | Eoff et al. |
| 7,493,957 | B2 | 2/2009 | Nguyen et al. |
| 7,552,771 | B2 | 6/2009 | Eoff et al. |
| 7,589,048 | B2 * | 9/2009 | Eoff ........................ C09K 8/035 166/305.1 |
| 7,759,292 | B2 | 7/2010 | Eoff et al. |
| 7,931,084 | B2 | 4/2011 | Nguyen et al. |
| 8,016,039 | B2 * | 9/2011 | Hodgins .............. C09K 8/5083 166/270 |

(Continued)

OTHER PUBLICATIONS

Daneshy, Ali, *World Oil*, "Multistage fracturing using plug-and-pert systems," Oct. 2011, vol. 232, No. 10. (10 pages), retrieved from the internet Feb. 12, 2015. www.worldoil.com/magazine/2011/october-2011/features/multistage-fracturing-usin . . .

(Continued)

*Primary Examiner* — Anuradha Ahuja
(74) *Attorney, Agent, or Firm* — Haynes and Boone, LLP

(57) ABSTRACT

A method for controlling water passage from an interval undergoing hydraulic fracturing to another interval in the same or a different well bore. The method introduces a relative permeability modifier at a pressure sufficient to create or enhance at least one fracture and fracture face in the subterranean formation surrounding the interval during fracturing. The method can reduce the water passage between two or more intervals of a well bore and between two or more well bores. The method can reduce the amount of water produced from a well, which reduces the processing necessary to remove water from the hydrocarbons produced from the well.

12 Claims, 2 Drawing Sheets

(56) References Cited

U.S. PATENT DOCUMENTS

| | | | |
|---|---|---|---|
| 8,196,655 B2* | 6/2012 | Kalman | E21B 43/16 |
| | | | 166/250.01 |
| 8,278,250 B2 | 10/2012 | Dalrymple et al. | |
| 8,623,793 B2 | 1/2014 | Eoff et al. | |
| 8,883,695 B2 | 11/2014 | Eoff et al. | |
| 2003/0051876 A1* | 3/2003 | Tolman | E21B 17/203 |
| | | | 166/313 |
| 2004/0229757 A1* | 11/2004 | Eoff | C09K 8/035 |
| | | | 507/219 |
| 2005/0000694 A1* | 1/2005 | Dalrymple | C09K 8/68 |
| | | | 166/307 |
| 2005/0194140 A1* | 9/2005 | Dalrymple | C09K 8/5083 |
| | | | 166/279 |
| 2006/0124309 A1* | 6/2006 | Nguyen | C09K 8/508 |
| | | | 166/308.2 |
| 2006/0283592 A1* | 12/2006 | Sierra | C09K 8/50 |
| | | | 166/281 |
| 2008/0000639 A1* | 1/2008 | Clark | E21B 43/14 |
| | | | 166/281 |
| 2008/0009424 A1* | 1/2008 | Stavland | C09K 8/502 |
| | | | 507/225 |
| 2008/0173448 A1* | 7/2008 | Nguyen | C09K 8/5083 |
| | | | 166/270 |
| 2008/0196897 A1* | 8/2008 | Nguyen | C09K 8/502 |
| | | | 166/295 |
| 2009/0203555 A1* | 8/2009 | Milne | C09K 8/508 |
| | | | 507/222 |
| 2012/0264885 A1* | 10/2012 | Eoff | C09K 8/508 |
| | | | 525/296 |
| 2012/0325462 A1* | 12/2012 | Roussel | E21B 43/26 |
| | | | 166/250.1 |
| 2014/0246194 A1* | 9/2014 | Artus | E21B 43/17 |
| | | | 166/271 |

OTHER PUBLICATIONS

University of North Dakota Energy & Environmental Research, "Beyond the Boom: Next Generation Science and Engineering Opportunities to Optimize the Bakken Petroleum System," (3 pages), retrieved from the internet Feb. 12, 2015. www.undereerc.org/bakken/completiontechnologies.aspx.

* cited by examiner

METHODS OF CONTROLLING WATER PRODUCTION IN HORIZONTAL WELLS WITH MULTISTAGE FRACTURES

FIELD

The present disclosure relates to a method for controlling water passage from an interval undergoing hydraulic fracturing to another interval in the same or a different well bore. The method can minimize or lessen the amount of water that passes through the subterranean formations that surround well bores. In addition, the method can reduce the amount of water produced from a well, which reduces the amount of processing necessary to remove water from the hydrocarbons produced from the well.

BACKGROUND

The production of water with hydrocarbons from subterranean wells constitutes a significant problem, because the processes that remove the water are costly and time consuming. While hydrocarbon-producing wells are usually completed in hydrocarbon-bearing formations, such formations may contain, or be near to, water-bearing sections. The high mobility of water may allow the water to flow into the well bore by way of natural fractures or high permeability sections present in the formation. Over the life of such wells, the ratio of water to hydrocarbons recovered may become undesirable in view of the cost of producing the water, separating the water from the hydrocarbons, and safely disposing of the water.

Many of the subterranean stimulation treatments used to enhance hydrocarbon production can increase the amount of water production. One such stimulation treatment is hydraulic fracturing. During hydraulic fracturing, a well bore is divided into intervals and each interval is separately fractured by pumping specialized fluids, such as aqueous fluids, into the subterranean formation at sufficient pressures to create or enhance at least one fracture and fracture face within the subterranean formation surrounding the well bore. These fractures increase fluid flow through the subterranean formation to the well bore. Of course, if the subterranean formation contains water, then the flow of water into the well bore will also be increased.

To make matters worse, the aqueous fluids typically used for hydraulic fracturing can also pass water into the well bore. For example, when water or an aqueous solution is pumped into an interval at a pressure sufficient to induce fractures, the fractures can inadvertently connect one interval of a well bore to another interval of the same well bore that has already undergone fracturing. This interconnecting fracture can allow water from the fracturing process of one interval to pass into another interval or another well bore that has already been fractured, completed, or even begun producing. Similarly, when well bores are located close to each other, then the water or aqueous solution pumped into an interval of one well bore during fracturing can pass from the interval of one well bore to the interval of another well bore that has already undergone fracturing. This interconnecting fracture can allow water from the fracturing process of one well bore to pass into another well bore that has already been fractured, completed, or even begun producing.

There is a need to prevent or minimize the amount of water that passes from one interval to another when intervals of a well bore undergo hydraulic fracturing in close proximity to each other.

There is a need to prevent or minimize the amount of water that passes from one interval to another when two or more wells undergo hydraulic fracturing in close proximity to each other.

SUMMARY

A method of reducing water permeability of two or more intervals in a well bore during hydraulic fracturing is presented. In several exemplary embodiments, the method includes isolating a first interval in the well bore. In several exemplary embodiments, the method includes introducing a first treatment fluid into the first interval penetrating a first subterranean formation at a first pressure sufficient to create or enhance at least one fracture and fracture face in the first subterranean formation, wherein the first treatment fluid includes a first aqueous fluid and a first relative permeability modifier. In several exemplary embodiments, the method includes allowing the first treatment fluid to penetrate the first subterranean formation along the at least one fracture and fracture face. In several exemplary embodiments, the method includes introducing a first proppant composition into the first interval and the at least one fracture in the first subterranean formation, the first proppant composition including a first proppant and a first carrier fluid. In several exemplary embodiments, the method includes isolating a second interval in the well bore. In several exemplary embodiments, the method includes introducing a second treatment fluid into the second interval penetrating a second subterranean formation at a second pressure sufficient to create or enhance at least one fracture and fracture face in the second subterranean formation, wherein the second treatment fluid includes a second aqueous fluid and a second relative permeability modifier. In several exemplary embodiments, the method includes allowing the second treatment fluid to penetrate the first subterranean formation along the at least one fracture and fracture face. In several exemplary embodiments, the method includes introducing a second proppant composition into the second interval and the at least one fracture in the second subterranean formation, the second proppant composition including a second proppant and a second carrier fluid.

In several exemplary embodiments, the method further includes repeating each step for three or more intervals in the well bore. In several exemplary embodiments, the method further includes isolating at least one of a third, fourth, fifth, and sixth interval in the well bore. In several exemplary embodiments, the method includes introducing a third, fourth, fifth, or sixth treatment fluid into the third, fourth, fifth, or sixth interval penetrating a third, fourth, fifth, or sixth subterranean formation at a third, fourth, fifth, or sixth pressure sufficient to create or enhance at least one fracture and fracture face in the third, fourth, fifth, or sixth subterranean formation, wherein the third, fourth, fifth, or sixth treatment fluid includes a third, fourth, fifth, or sixth aqueous fluid and a third, fourth, fifth, or sixth relative permeability modifier, respectively. In several exemplary embodiments, the method includes introducing a third, fourth, fifth, or sixth proppant composition into the third, fourth, fifth, or sixth interval and the at least one fracture in the third, fourth, fifth, or sixth subterranean formation, the third, fourth, fifth, or sixth proppant composition including a third, fourth, fifth, or sixth proppant and a third, fourth, fifth, or sixth carrier fluid, respectively. In several exemplary embodiments, at least two of the first, second, third, fourth, fifth, or sixth intervals are interconnected by at least one fluid channel outside of the well bore. In several exemplary embodiments of the method, the first and second relative permeability modifier each independently have a molecular weight of from about 100,000 Daltons to about 10,000,000 Daltons. In several exemplary embodiments of the method, the first and second relative permeability modifier each independently include a polymer backbone and a hydrophobic branch, the polymer backbone including polar heteroatoms, the hydrophobic branch including an organic acid derivative selected from the group consisting of: an anhydride of octenyl succinic acid, an ester of octenyl succinic acid, an amide of octenyl succinic acid, an anhydride of dodecenyl succinic acid, an ester of dodecenyl succinic acid, and an amide of dodecenyl succinic acid. In several exemplary embodiments of the method, the first relative permeability modifier is present in the first treatment fluid in a first amount of from about 0.05% to about 2% or from about 1% to about 1.5% weight by volume of the first treatment fluid. In several exemplary embodiments of the method, the second relative permeability modifier is present in the second treatment fluid in a second amount of from about 0.05% to about 2% or from about 1% to about 1.5% weight by volume of the second treatment fluid. In several exemplary embodiments, the first treatment fluid and the second treatment fluid each independently further include at least one gelling agent. In several exemplary embodiments of the method, a distance between the first interval and the second interval is from about 15 meters to about 180 meters or about 15 meters to 120 meters.

A method of reducing water permeability of a first and second well bore during hydraulic fracturing is presented. In several exemplary embodiments, the method includes isolating each of first intervals in a first well bore, fracturing a first subterranean formation. In several exemplary embodiments, the method includes introducing a first treatment fluid into each of the first intervals penetrating the first subterranean formation at a first pressure sufficient to create or enhance at least one fracture and fracture face in the first subterranean formation, wherein the first treatment fluid includes a first aqueous fluid. In several exemplary embodiments, the first treatment fluid includes a first aqueous fluid and a first relative permeability modifier. In several exemplary embodiments, the method includes introducing a first proppant composition into each of the first intervals and the at least one fracture in the first subterranean formation, the first proppant composition including a first proppant and a first carrier fluid. In several exemplary embodiments, the method includes isolating each of second intervals in a second well bore, fracturing a second subterranean formation. In several exemplary embodiments, the method includes introducing a second treatment fluid into each of the second intervals penetrating the second subterranean formation at a second pressure sufficient to create or enhance at least one fracture and fracture face in the second subterranean formation, wherein the second treatment fluid includes a second aqueous fluid. In several exemplary embodiments, the second treatment fluid includes a second aqueous fluid and a second relative permeability modifier. In several exemplary embodiments, the method includes introducing a second proppant composition into each of the second intervals and the at least one fracture in the second subterranean formation, the second proppant composition including a second proppant and a second carrier fluid. In several exemplary embodiments of the method, the first subterranean formation and second subterranean formation are interconnected by at least one fluid channel.

In several exemplary embodiments of the method, one or both of the treatment fluids contains a relative permeability modifier. For example, several exemplary embodiments of the method, the first treatment fluid includes a first relative permeability modifier. In several exemplary embodiments of the method, the second treatment fluid includes a second permeability modifier. In several exemplary embodiments of the method, both the first treatment fluid and the second treatment fluid include a first and second relative permeability modifier, respectively. In several exemplary embodiments of the method, the second treatment fluid includes a second permeability modifier. In several exemplary embodiments of the method, the first treatment fluid includes a first relative permeability modifier and the second treatment fluid includes a second permeability modifier.

In several exemplary embodiments, the method further includes repeating each step for three or more intervals in at least one of the first and second well bore.

In several exemplary embodiments of the method, the first and second relative permeability modifier each independently have a molecular weight of from about 100,000 Daltons to about 10,000,000 Daltons. In several exemplary embodiments of the method, the first and second relative permeability modifier each independently include a polymer backbone and a hydrophobic branch, the polymer backbone including polar heteroatoms, the hydrophobic branch including an organic acid derivative selected from the group consisting of: an anhydride of octenyl succinic acid, an ester of octenyl succinic acid, an amide of octenyl succinic acid, an anhydride of dodecenyl succinic acid, an ester of dodecenyl succinic acid, and an amide of dodecenyl succinic acid. In several exemplary embodiments of the method, the first relative permeability modifier is present in the first treatment fluid in a first amount of from about 0.05% to about 2% or from about 1% to about 1.5% weight by volume of the first treatment fluid. In several exemplary embodiments of the method, the second relative permeability modifier is present in the second treatment fluid in a second amount of from about 0.05% to about 2% or from about 1% to about 1.5% weight by volume of the second treatment fluid. In several exemplary embodiments of the method, the first treatment fluid and the second treatment fluid each independently further include at least one gelling agent. In several exemplary embodiments of the method, a distance between the first well bore and the second well bore is from about 100 meters to about 5,000 meters. In several exemplary embodiments of the method, a distance between the first well bore and the second well bore is from about 50 meters to about 1,000 meters.

BRIEF DESCRIPTION OF THE DRAWINGS

The following description of the drawings are merely embodiments of the disclosure and should not be considered limited. Also, the drawings are merely a depiction of embodiments and are not drawn to scale.

DETAILED DESCRIPTION

Figure 1:
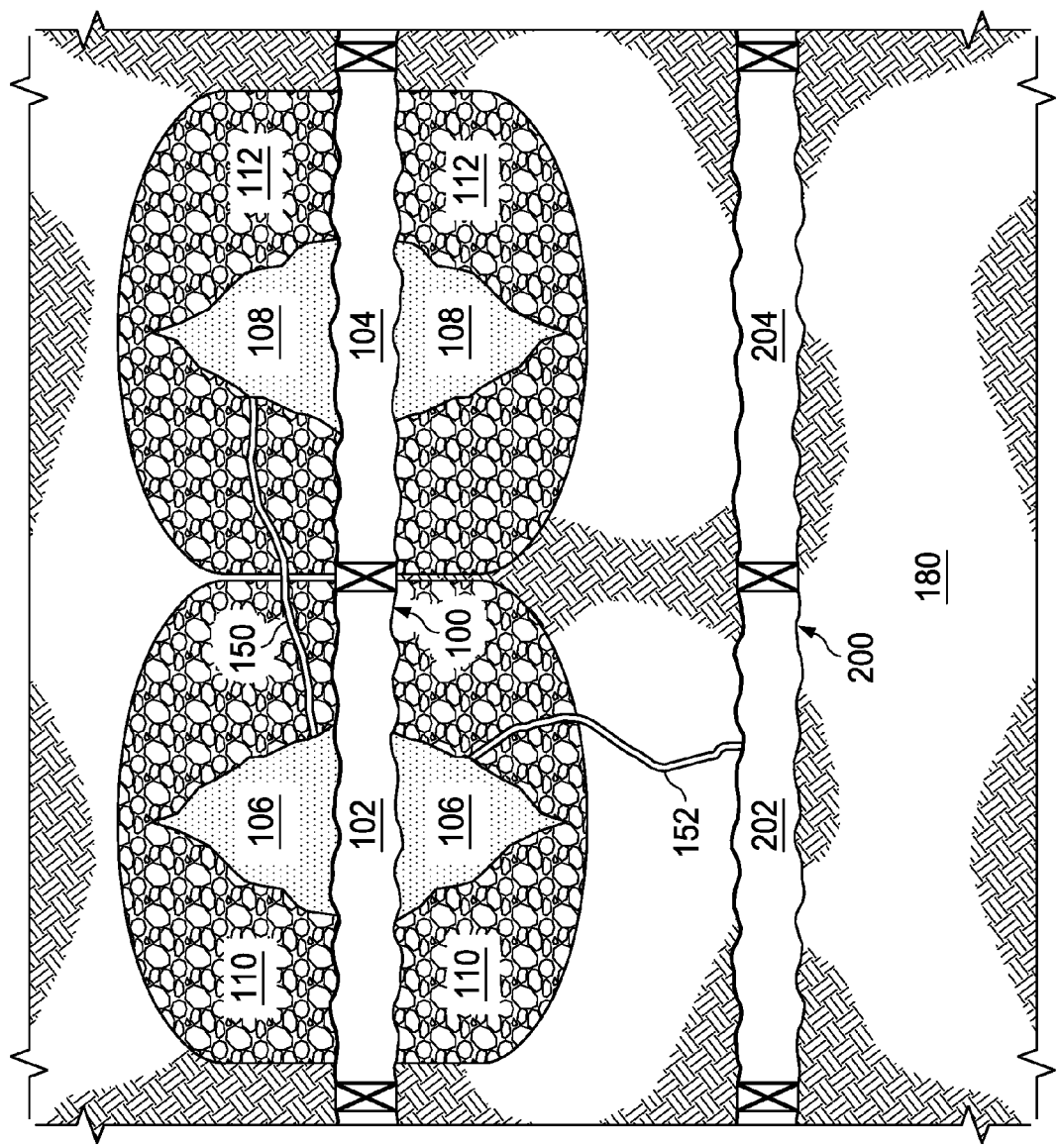
FIG. 1 schematically depicts an embodiment of a first well bore undergoing fracturing in a first interval located adjacent to a second interval in the same well bore and close to a second well bore that has not undergone hydraulic fracturing.

The term "about" indicates a range which includes ±5% when used to describe a single number. When applied to a range, the term "about" indicates that the range includes −5% of a numerical lower boundary and +5% of an upper numerical boundary. For example, a range of from about 100° C. to about 200° C., includes a range of from 95° C. to 210° C. However, when the term "about" modifies a percentage, then the term means ±1% of the number or numerical boundaries, unless the lower boundary is 0%. Thus, a range of 5-10%, includes 4-11%. A range of 0-5%, includes 0-6%.

Unless indicated otherwise, all measurements have metric units.

Unless indicated otherwise, the terms "a," "an," or "the" can refer to one or more than one of the noun they modify.

The term "interval" refers to a length of well bore that can be closed off from the down-hole portion of the well bore.

The phrase "percent weight by volume" or "% weight by volume" refers to a concentration of weight in grams of a substance per 100 milliliters of liquid. For example, a concentration of 2 g of polymer per 100 milliliters of water would be 2% weight by volume.

The phrase "interconnected by at least one fluid channel outside of the well bore" means that there is an at least partially induced fracture in the subterranean formation that connects an interval or well bore. This phrase excludes any pipes and the well bore itself.

A method of reducing water permeability of two or more intervals in a well bore penetrating a subterranean formation during hydraulic fracturing is presented. In several exemplary embodiments, the general method includes isolating an interval in the well bore; introducing a treatment fluid into the interval at a pressure sufficient to create or enhance at least one fracture and fracture face in the subterranean formation, wherein the treatment fluid includes an aqueous fluid and a relative permeability modifier; and introducing a proppant composition into the interval and the at least one fracture and fracture face in the subterranean formation, the proppant composition including a proppant and a carrier fluid. Hydraulic fracturing typically involves separating lengths of a well bore into multiple sections, so that each section can be separately fractured using this general method. Therefore, it is understood that these three process steps can be repeated for each interval for which decreased water permeability is desired. Further, these three process steps can be used for two or more intervals.

The addition of water permeability reducing agents is known to reduce the water permeability of the subterranean formations surrounding wells. However, according to conventional methods, all of the intervals of a well bore are fractured before any water permeability reducing agents are added. If anything, the water permeability reducing agents are added just after the completion steps and/or just before the production of hydrocarbons. However, it has been found that these conventional methods allow for water to permeate from one interval during hydraulic fracturing to another interval in the same well bore. Similarly, it has been found that these conventional methods allow for water to permeate from one interval of one well during hydraulic fracturing to another interval in a different well bore.

After discovering this problem, the inventors developed a method of separately treating each interval during the hydraulic fracturing step and before any proppants are introduced to the fractured interval. By separately reducing the permeability of each interval as the interval is fractured, the method can reduce the water passage from the intervals being fractured to other intervals in the same or a different well bore that has already undergone the hydraulic fracturing process. The result is that this method can not only reduce the permeability between intervals of the same well bore; it can also reduce the permeability of the subterranean formations surrounding different intervals of different well bores. A benefit of the methods presented herein is the reduction of water production during hydrocarbon production, even when one or more of the intervals in close proximity are undergoing hydraulic fracturing. This benefit allows for the simultaneous processing of well bores and intervals in close proximity to one another, which results in significant production efficiencies.

Referring to FIG. 1, in several exemplary embodiments, a first well bore 100 (parent well) and the second well bore 200 (child well) are located in a subterranean formation 180 and are generally disposed in a horizontal orientation. In several exemplary embodiments, the first well bore 100 has two or more intervals, including a first interval 102 and a second interval 104. The first interval 102 and the second interval 104 have undergone hydraulic fracturing to create or enhance at least one fracture and fracture face 106 (propped fracture) and a second fracture and fracture face 108. However, in several exemplary embodiments, the fracturing process creates at least one fluid channel outside of the well bore 150 that connects the first fracture 106 and the second subterranean formation 108. In several exemplary embodiments, the fracturing process also creates at least one fluid channel 152 connecting the first well bore 100 and second well bore 200 (i.e. that connects the first fracture 106 surrounding the first bore 100 to a second well bore 200). Without wishing to be bound by theory, it is believed that the process of adding a first treatment fluid to the first interval 102 and a second treatment fluid to the second interval 104 during the fracturing process of each interval creates a first water control barrier 110 and a second water control barrier 112, respectively. The first water control barrier 110 and the second water control barrier 112 can reduce the water permeability of the first fracture 106 and the second fracture 108 as well as that of the fluid channel 150 connecting the first interval 102 and the second interval 104 and the fluid channel 152 connecting the first well bore 100 and the second well bore 200. The second well bore can have a first interval in the second well bore 202 and a second interval in the second well bore 204.

Figure 2:
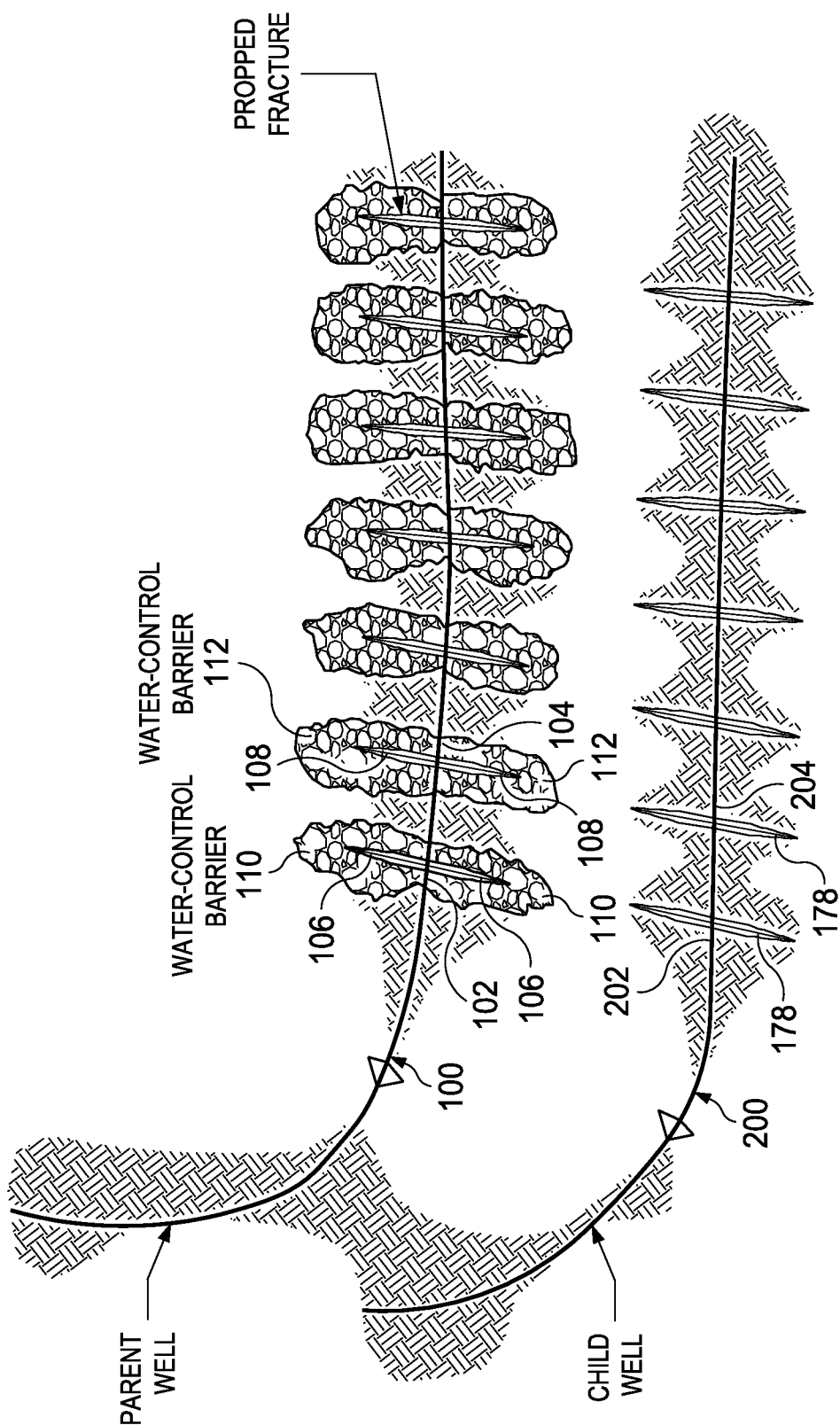
FIG. 2 schematically depicts an embodiment of a first well bore undergoing fracturing adjacent to a second well bore.

Referring to FIG. 2, in several exemplary embodiments, a first well bore 100 (parent well) and the second well bore 200 (child well) are located in a subterranean formation 180 and are generally disposed in a horizontal orientation. In several exemplary embodiments, the first well bore 100 has two or more intervals, including a first interval 102 and a second interval 104. The first interval 102 and the second interval 104 have undergone hydraulic fracturing to create or enhance at least one fracture and fracture face 106 (propped fracture) and a second fracture and fracture face 108. The second well bore can have a first interval in the second well bore 202 and a second interval in the second well bore 204, which can also have propped fractures 178. Without wishing to be bound by theory, it is believed that the process of adding a first treatment fluid to the first interval 102 and a second treatment fluid to the second interval 104 during the fracturing process of each interval creates a first water control barrier 110 and a second water control barrier 112, respectively. The first water control barrier 110 and the second water control barrier 112 can reduce the water permeability of the first fracture 106 and the second fracture 108 as reducing the amount of water passing from the first well bore 100 to the second well bore 200.

The term "introducing" is not limited, and includes any method of adding or placing a fluid into the well bore. Suitable methods for introducing a fluid to the well bore include injecting, pumping, and pouring.

The "well bore" can be vertical or horizontal.

In several exemplary embodiments, the pressure sufficient to create or enhance at least one fracture and fracture face in the subterranean formation surrounding a well bore interval varies depending on the properties of the subterranean formation, the depth of the interval, and the designed fracture parameters, and the properties of the fracturing fluid. It is understood that the pressure can be the same or different for each interval to be subjected to hydraulic fracturing.

In several exemplary embodiments, the treatment fluid includes an aqueous fluid. The aqueous fluid can be fresh water, salt water (e.g., water containing one or more salts, such as potassium chloride, dissolved therein), brine (e.g., saturated salt water), or seawater. Examples of suitable salts include, but are not limited to, chloride, bromide, acetate, and formate salts of ammonium, alkyl ammonium, potassium, sodium, calcium, magnesium, and zinc. It is understood that the aqueous solution for each interval to be subjected to hydraulic fracturing can be the same or different.

First Relative Permeability Modifier Embodiment

In several exemplary embodiments, the treatment fluid includes a relative permeability modifier. In several exemplary embodiments, the relative permeability modifier is a reaction product of a hydrophilic polymer and a hydrophobic compound. In several exemplary embodiments, the hydrophilic polymers include a polymer backbone that includes polar heteroatoms. In several exemplary embodiments, the polar heteroatoms present within the polymer backbone of the hydrophilic polymers include, but are not limited to, oxygen, nitrogen, sulfur, or phosphorous.

In several exemplary embodiments, the hydrophilic polymers include polar heteroatoms within the polymer backbone, which include homo-, co-, or terpolymers, such as celluloses, chitosans, polyamides, polyether amines, polyethyleneimines, polyhydroxyetheramines, polylysines, polysulfones, and starches. In several exemplary embodiments, the starch is a cationic starch. In several exemplary embodiments, a suitable cationic starch may be formed by reacting a starch, such as corn, maize, waxy maize, potato, tapioca, and the like, with the reaction product of epichlorohydrin and trialkylamine.

In several exemplary embodiments, the hydrophobic compounds that are capable of reacting with the hydrophilic polymers to form the relative permeability modifier include alkyl halides, sulfonates, sulfates, and organic acid derivatives. Examples of suitable organic acid derivatives include octenyl succinic acid; dodecenyl succinic acid; and anhydrides, esters, and amides of octenyl succinic acid or dodecenyl succinic acid. In several exemplary embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

In several exemplary embodiments, the relative permeability modifier has a molecular weight of from about 100,000 Daltons to about 10,000,000 Daltons or from about 200,000 to about 5,000,000 Daltons. In several exemplary embodiments, the relative permeability modifier includes a polymer backbone including polar heteroatoms. In several exemplary embodiments, the polar heteroatoms present within the polymer backbone of the relative permeability modifier include oxygen, nitrogen, sulfur, or phosphorous.

In several exemplary embodiments, the relative permeability modifier is a reaction product of a hydrophilic polymer and a hydrophilic compound that are capable of reacting with each other. In several exemplary embodiments, the hydrophilic polymers suitable for forming the relative permeability modifiers are capable of reacting with hydrophilic compounds. In certain exemplary embodiments, suitable hydrophilic polymers include, homo-, co-, or terpolymers such as polyvinylamines, poly(vinylamines/vinyl alcohols), and alkyl acrylate polymers in general. Additional examples of alkyl acrylate polymers include polydimethylaminoethyl methacrylate, polydimethylaminopropyl methacrylamide, poly(acrylamide/dimethyl aminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethyl aminopropyl methacrylamide), and poly (methacrylic acid/dimethylaminopropyl methacrylamide). In several exemplary embodiments, the hydrophilic polymer contains reactive amino groups in the polymer backbone or as pendant groups, which are capable of reacting with hydrophilic compounds. In an exemplary embodiment, the hydrophilic polymer includes dialkyl amino pendant groups. In an exemplary embodiment, the hydrophilic polymer includes a dimethyl amino pendant group and at least one monomer including dimethylaminoethyl methacrylate or dimethylaminopropyl methacrylamide.

In several exemplary embodiments, the hydrophilic polymers include a polymer backbone including polar heteroatoms, wherein the polar heteroatoms present within the polymer backbone of the hydrophilic polymers include oxygen, nitrogen, sulfur, or phosphorous. Suitable hydrophilic polymers including polar heteroatoms within the polymer backbone include homo-, co-, or terpolymers, such as celluloses, chitosans, polyamides, polyetheramines, polyethyleneimines, polyhydroxyetheramines, polylysines, polysulfones, and starches. In several exemplary embodiments, the starch is a cationic starch. A suitable cationic starch may be formed by reacting a starch, such as corn, maize, waxy maize, potato, tapioca, and the like, with the reaction product of epichlorohydrin and trialkylamine.

In several exemplary embodiments, the hydrophilic compounds suitable for reaction with the hydrophilic polymers include polyethers including halogen; sulfonates; sulfates; and organic acid derivatives. Examples of suitable organic acid derivatives include octenyl succinic acid; dodecenyl succinic acid; and anhydrides, esters, and amides of octenyl succinic acid or dodecenyl succinic acid. Suitable polyethers include polyethylene oxides, polypropylene oxides, polybutylene oxides, and mixtures thereof. In an exemplary embodiment, the polyether includes epichlorohydrin terminated polyethylene oxide methyl ether.

In several exemplary embodiments, the relative permeability modifiers formed from the reaction of a hydrophilic polymer with a hydrophilic compound have estimated molecular weights of from about 100,000 Daltons to about 10,000,000 Daltons and weight ratios of the hydrophilic polymers to the polyethers of from about 1:1 to about 10:1. Suitable relative permeability modifiers having molecular weights and weight ratios in the ranges set forth above include the reaction product of polydimethylaminoethyl methacrylate with epichlorohydrin terminated polyethyleneoxide methyl ether; the reaction product of polydimethyl aminopropyl methacrylamide with epichlorohydrin terminated polyethyleneoxide methyl ether; and the reaction product of poly(acrylamide/dimethylaminopropyl methacrylamide) with epichlorohydrin terminated polyethyleneoxide methyl ether. In several exemplary embodiments, the relative permeability modifier includes the reaction product of a polydimethylaminoethyl methacrylate with epichlorohydrin terminated polyethyleneoxide methyl ether having a weight ratio of polydimethylaminoethyl methacrylate to epichlorohydrin terminated polyethyleneoxide methyl ether of 3:1.

Second Relative Permeability Modifiers Embodiment

In several examples of the second embodiment, the treatment fluid includes a relative permeability modifier. In several examples of the second embodiment, the relative permeability modifiers are generally hydrophobically modified hydrophilic polymers. Hydrophobically modified hydrophilic polymers vary widely in structure, but generally include a hydrophilic polymer that has been at least partially chemically modified with hydrophobic groups (e.g., long chain alkyl groups having more than about 4 carbon atoms. In several examples of the second embodiment, an existing hydrophilic polymer can be at least partially functionalized with a plurality of hydrophobic groups to produce a hydrophobically modified hydrophilic polymer. In several examples of the second embodiment, a hydrophilic monomer unit functionalized with a hydrophobic group can be polymerized with itself or copolymerized with a hydrophilic monomer unit not containing hydrophobic functionalization to produce a hydrophobically modified hydrophilic polymer.

In several examples of the second embodiment, the hydrophobically modified hydrophilic polymers can include at least one hydrophobically modified hydrophilic monomer and, optionally, at least one hydrophilic monomer. As such, the hydrophobically modified hydrophilic polymers can be homopolymers, copolymers, terpolymers or higher order polymer structures. Positioning of the hydrophilic monomer units and the hydrophobically modified hydrophilic monomer units in copolymer and higher order polymer structures can vary without limitation and can be, for example, alternating, random, block or a combination thereof. Examples of suitable hydrophilic monomers include, for example, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, methacrylic acid, dimethylaminopropyl methacrylate, dimethylaminopropyl methacrylamide, trimethylammoniumethyl methacrylate halide (where the halide is chloride, bromide, iodide or a halide equivalent such as, for example, a tosylate or methanesulfonate), acrylamide, methacrylamide, and hydroxyethyl acrylate.

In several examples of the second embodiment, hydrophobically modified hydrophilic polymers can be prepared by polymerizing at least one hydrophobically modified hydrophilic monomer or a mixture of at least one hydrophobically modified hydrophilic monomer and at least one hydrophilic monomer. Illustrative hydrophobically modified hydrophilic monomers include, for example, alkyl acrylates, alkyl methacrylates, alkyl acrylamides, alkyl methacrylamides, alkyldimethylammoniumethyl methacrylate bromide, alkyldimethyl ammoniumethyl methacrylate chloride, alkyldimethylammoniumethyl methacrylate iodide, alkyldimethylammoniumpropyl methacrylate bromide, alkyldimethylammoniumpropyl methacrylate chloride, alkyldimethylammoniumpropyl methacrylate iodide, alkyldimethyl ammoniumethyl methacrylamide bromide, alkyldimethylammoniumethyl methacrylamide chloride, alkyldimethylammoniumethyl methacrylamide iodide, alkyldimethyl ammoniumpropyl methacrylamide bromide, alkyldimethylammoniumpropyl methacrylamide chloride, and alkyldimethylammoniumpropyl methacrylamide iodide. In general, alkyl groups of the hydrophobically modified hydrophilic monomers contain about 4 to about 22 carbon atoms.

In several examples of the second embodiment, the hydrophobically modified hydrophilic polymer includes at least one alkyldimethylammoniumethyl methacrylate halide hydrophobically modified hydrophilic monomer. In several examples of the second embodiment, the alkyl group includes about 4 to about 22 carbon atoms. In several examples of the second embodiment, the halide can be chloride, bromide, iodide, or a halide equivalent (e.g., toluenesulfonate or methanesulfonate). In several examples of the second embodiment, the alkyl group can be a cetyl group containing 16 carbon atoms. That is, in several examples of the second embodiment, a cetyldimethylammoniumethyl methacrylate halide monomer unit can be polymerized to form the hydrophobically modified hydrophilic polymer, optionally with another hydrophilic monomer, or a dimethylaminoethyl methacrylate monomer unit in a hydrophilic polymer can be hydrophobically modified with an agent such as, for example, a cetyl halide or a cetyl halide equivalent.

In several examples of the second embodiment, the relative permeability modifier can be a hydrophobically modified hydrophilic polymer that includes at least one monomer unit derived from a cetyldimethyl ammoniumethyl methacrylate halide. Such a relative permeability modifier contains at least the following structural unit in its polymer backbone, where the wavy lines represent bonding to other monomer units.

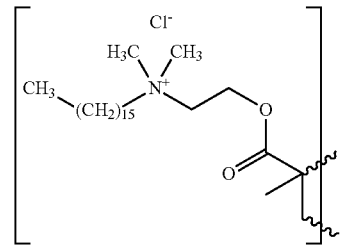

As noted above, relative permeability modifiers containing this monomer unit can be homopolymers or copolymers or higher order polymer structures containing a hydrophilic monomer. For example, in one embodiment of the second embodiment, a relative permeability modifier can contain dimethylaminoethyl methacrylate and the above monomer unit derived from a cetyldimethylammoniumethyl methacrylate halide. This RPM is sold under the trade name "HPT-1" by Halliburton Energy Services of Duncan, Okla. Specific synthetic procedures and relating to this RPM are described in U.S. Pat. No. 7,114,568, the entire disclosure of which is incorporated herein by reference.

Third Relative Permeability Modifiers Embodiment

In several examples of the third embodiment, the treatment fluid includes a relative permeability modifier fluid. In several examples of the third embodiment, the relative permeability modifier fluids include an aqueous fluid and a relative permeability modifier. As used in the third embodiment, "relative permeability modifier" refers to any material capable of reducing the permeability of a subterranean formation to aqueous fluids without substantially reducing the permeability of the subterranean formation to hydrocarbons. In several examples of the third embodiment, a variety of additional additives suitable for use in subterranean operations also may be included in the relative permeability modifier fluids as desired. In several examples of the third embodiment, the aqueous fluid of the relative permeability modifier fluids may include freshwater, saltwater, brine (e.g., saturated or unsaturated saltwater), or seawater. Generally, the aqueous fluid may be from any source, provided that it does not contain components that may adversely affect other components in the relative permeability modifier fluids.

In several examples of the third embodiment, the relative permeability modifiers may be any relative permeability modifier that is suitable for use in subterranean operations. In several examples of the third embodiment, after introducing the relative permeability modifier fluid into a portion of the subterranean formation, the relative permeability modifier should attach to surfaces within the porosity of the subterranean formation, so as to reduce the permeability of the portion of the subterranean formation to aqueous fluids without substantially changing its permeability to hydrocarbons. Examples of suitable relative permeability modifiers include water-soluble polymers with or without hydrophobic or hydrophilic modification. As used in the third embodiment, "water-soluble" refers to at least 0.01 weight percent soluble in distilled water. A water-soluble polymer with hydrophobic modification is referred to in the third embodiment as a "hydrophobically modified polymer." As used in the third embodiment, the term "hydrophobic modification," or "hydrophobically modified," refers to the incorporation into the hydrophilic polymer structure of hydrophobic groups, wherein the hydrophobic group is an alkyl having a chain length of from about 4 to about 22 carbons. A water-soluble polymer with hydrophilic modification is referred to in the third embodiment as a "hydrophilically modified polymer." As used in the third embodiment, the term "hydrophilic modification," or "hydrophilically modified," refers to the incorporation into the hydrophilic polymer structure of hydrophilic groups, such as to introduce branching or to increase the degree of branching in the hydrophilic polymer. Combinations of hydrophobically modified polymers, hydrophilically modified polymers, and water-soluble polymers without hydrophobic or hydrophilic modification may be included in the relative permeability modifier fluids.

In several examples of the third embodiment, the hydrophobically modified polymers typically have molecular weights of from about 100,000 Daltons to about 10,000,000 Daltons. While these hydrophobically modified polymers have hydrophobic groups incorporated into the hydrophilic polymer structure, they remain water-soluble. In several examples of the third embodiment, a mole ratio of a hydrophilic monomer to the hydrophobic compound in the hydrophobically modified polymer is from about 99.98:0.02 to about 90:10, wherein the hydrophilic monomer is a calculated amount present in the hydrophilic polymer. In several examples of the third embodiment, the hydrophobically modified polymers include a polymer backbone, the polymer backbone including polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized using any suitable method. In one example of the third embodiment, the hydrophobically modified polymers may be a reaction product of a hydrophilic polymer and a hydrophobic compound. In another example of the third embodiment, the hydrophobically modified polymers may be prepared from a polymerization reaction including a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In several examples of the third embodiment, suitable hydrophobically modified polymers may be synthesized by the hydrophobic modification of a hydrophilic polymer. In several examples of the third embodiment, the hydrophilic polymers suitable for forming hydrophobically modified polymers are capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In several examples of the third embodiment, the hydrophilic polymers include a polymer backbone and reactive amino groups in the polymer backbone or as pendant groups, the reactive amino groups capable of reacting with hydrophobic compounds. In several examples of the third embodiment, the hydrophilic polymers include dialkyl amino pendant groups. In several examples of the third embodiment, the hydrophilic polymers include a dimethyl amino pendant group and a monomer includes dimethylaminoethyl methacrylate or dimethylaminopropyl methacrylamide. In several examples of the third embodiment, the hydrophilic polymers include a polymer backbone, the polymer backbone including polar heteroatoms, wherein the polar heteroatoms present within the polymer backbone of the hydrophilic polymers include, but are not limited to, oxygen, nitrogen, sulfur, or phosphorous. Suitable hydrophilic polymers that include polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In several examples of the third embodiment, the starch is a cationic starch. In several examples of the third embodiment, a suitable cationic starch may be formed by reacting a starch, such as corn, maize, waxy maize, potato, and tapioca, and the like, with the reaction product of epichlorohydrin and trialkylamine.

In several examples of the third embodiment, the hydrophobic compounds that are capable of reacting with the hydrophilic polymers include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In several examples of the third embodiment, the hydrophobic compounds are alkyl groups having a chain length of from about 4 to about 22 carbons. In several examples of the third embodiment, the hydrophobic compounds have an alkyl chain length of from about 7 to about 22 carbons. In several examples of the third embodiment, the hydrophobic compounds are alkyl groups having a chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in several examples of the third embodiment, suitable hydrophobically modified polymers also may be prepared from a polymerization reaction including a hydrophilic monomer and a hydrophobically modified hydrophilic monomer. Examples of suitable methods of their preparation are described in U.S. Pat. No. 6,476,169, the entire disclosure of which is incorporated herein by reference. The hydrophobically modified polymers synthesized from the polymerization reactions may have estimated molecular weights of from about 100,000 Daltons to about 10,000,000 Daltons and mole ratios of the hydrophilic monomer(s) to the hydrophobically modified hydrophilic monomer(s) of from about 99.98:0.02 to about 90:10.

A variety of hydrophilic monomers may be used to form the hydrophobically modified polymers. Examples of suitable hydrophilic monomers include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropyl methacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamido ethyltrimethyl ammonium halide, quaternary salt derivatives of acrylamide, and quaternary salt derivatives of acrylic acid.

In several examples of the third embodiment, a variety of hydrophobically modified hydrophilic monomers also may be used to form the hydrophobically modified polymers. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In several examples of the third embodiment, the alkyl groups have from about 7 to about 22 carbons. In several examples of the third embodiment, the alkyl groups have from about 12 to about 18 carbons. In several examples of the third embodiment, the hydrophobically-modified hydrophilic monomer includes octadecyldimethyl ammoniumethyl methacrylate bromide, hexadecyldimethyl ammoniumethyl methacrylate bromide, hexadecyldimethyl ammoniumpropyl methacrylamide bromide, 2-ethylhexyl methacrylate, or hexadecyl methacrylamide.

Suitable hydrophobically modified polymers that may be formed from the above-described reactions include, but are not limited to, acrylamide/octadecyl dimethyl ammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another suitable hydrophobically modified polymer formed from the above-described reaction is an amino methacrylate/alkyl amino methacrylate copolymer. A suitable dimethylaminoethyl methacrylate/alkyl-dimethylammoniumethyl methacrylate copolymer is a dimethylaminoethyl methacrylate/hexadecyl-dimethylammoniumethyl methacrylate copolymer. As previously discussed, these copolymers may be formed by reactions with a variety of alkyl halides. For example, in several examples of the third embodiment, the hydrophobically modified polymer may be a dimethylaminoethyl methacrylate/hexadecyl-dimethylammoniumethyl methacrylate bromide copolymer.

Fourth Relative Permeability Modifiers Embodiment

In several examples of the forth embodiment, the treatment fluid includes a relative permeability modifier fluid. In several exemplary embodiments of the fourth embodiment, the relative permeability modifier fluid includes a water-soluble hydrophilically modified polymer. In several examples of the forth embodiment, the hydrophilically modified polymers typically have molecular weights of from about 100,000 Daltons to about 10,000,000 Daltons. In several examples of the forth embodiment, the hydrophilically modified polymers have a polymer backbone, the polymer backbone including polar heteroatoms. Generally, the polar heteroatoms present within the polymer backbone of the hydrophilically modified polymers include, but are not limited to, oxygen, nitrogen, sulfur, or phosphorous.

In several examples of the forth embodiment, the hydrophilically modified polymers may be synthesized using any suitable method. In one example of the fourth embodiment, the hydrophilically modified polymers may be a reaction product of a hydrophilic polymer and a hydrophilic compound. Those of ordinary skill in the art, with the benefit of this disclosure, will be able to determine other suitable methods for the preparation of suitable hydrophilically modified polymers.

In several examples of the forth embodiment, suitable hydrophilically modified polymers may be formed by additional hydrophilic modification, for example, to introduce branching or to increase the degree of branching, of a hydrophilic polymer. In several examples of the forth embodiment, the hydrophilic polymers suitable for forming the hydrophilically modified polymers should be capable of reacting with hydrophilic compounds. In several examples of the forth embodiment, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethyl aminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethyl aminopropyl methacrylamide), and poly(methacrylic acid/dimethylaminopropyl methacrylamide). In several examples of the forth embodiment, the hydrophilic polymers have a polymer backbone and reactive amino groups in the polymer backbone or as pendant groups, the reactive amino groups capable of reacting with hydrophilic compounds. In several examples of the forth embodiment, the hydrophilic polymers include dialkyl amino pendant groups. In several examples of the forth embodiment, the hydrophilic polymers have a dimethyl amino pendant group and at least one monomer including dimethylaminoethyl methacrylate or dimethylaminopropyl methacrylamide. In several examples of the forth embodiment, the hydrophilic polymers include a polymer backbone including polar heteroatoms, wherein the polar heteroatoms present within the polymer backbone of the hydrophilic polymers include, but are not limited to, oxygen, nitrogen, sulfur, or phosphorous. Suitable hydrophilic polymers that include polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In several examples of the forth embodiment, the starch is a cationic starch. A suitable cationic starch may be formed by reacting a starch, such as corn, maize, waxy maize, potato, tapioca, and the like, with the reaction product of epichlorohydrin and trialkylamine.

In several examples of the forth embodiment, the hydrophilic compounds suitable for reaction with the hydrophilic polymers include polyethers that includes halogens, sulfonates, sulfates, organic acids, and organic acid derivatives. Examples of suitable polyethers include, but are not limited to, polyethylene oxides, polypropylene oxides, and polybutylene oxides, and copolymers, terpolymers, and mixtures thereof. In several examples of the forth embodiment, the polyether includes an epichlorohydrin-terminated polyethylene oxide methyl ether.

In several examples of the forth embodiment, the hydrophilically modified polymers formed from the reaction of a hydrophilic polymer with a hydrophilic compound may have estimated molecular weights of from about 100,000 Daltons to about 10,000,000 Daltons and may have weight ratios of the hydrophilic polymers to the polyethers of from about 1:1 to about 10:1. Suitable hydrophilically modified polymers having molecular weights and weight ratios in the ranges set forth above include, but are not limited to, the reaction product of polydimethyl aminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In several examples of the forth embodiment, the hydrophilically modified polymer includes the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Sufficient concentrations of a suitable relative permeability modifier may be present in the treatment fluids (i.e. aqueous fluids) to provide the desired degree of diversion of water. The amount of the relative permeability modifier to include in the treatment fluid depends on a number of factors including, the composition of the fluid to be diverted of water and the porosity of the formation. In several examples of the forth embodiment, a relative permeability modifier may be present in the treatment fluid in an amount of from about 0.02% to about 10% by weight of the treatment fluid. In several examples of the forth embodiment, the relative permeability modifier may be present in an amount of from about 0.05% to about 1.0% by weight of the treatment fluid. In several examples of the forth embodiment, the relative permeability modifier may be provided in a concentrated aqueous solution prior to its combination with the other components necessary to form the treatment fluid.

In several examples of the forth embodiment, the water-soluble relative permeability modifiers include a water-soluble polymer without hydrophobic or hydrophilic modification. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropyl methacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamido ethyltrimethyl ammonium halide, quaternary salt derivatives of acrylamide and quaternary salt derivatives of acrylic acid.

Fifth Relative Permeability Modifiers Embodiment

In several examples of the fifth embodiment, suitable relative permeability modifiers may be any of a variety of compounds that are capable of selectively reducing the effective permeability of a formation to water without a comparable reduction of the formation's effective permeability to hydrocarbons. Suitable relative permeability modifiers generally include water-soluble polymers that attach to surfaces within the formation, reducing the water permeability without a comparable reduction in hydrocarbon permeability.

Those of ordinary skill in the art will appreciate that a variety of different water-soluble polymers may be suitable for use as the relative permeability modifiers. Examples of suitable water-soluble polymers include homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide quaternary salt derivatives of acrylic acid, and combinations thereof.

In addition, water-soluble polymers suitable for use as relative permeability modifiers also may include hydrophobically modified polymers. As used in the fifth embodiment, the terms "hydrophobically modified," "hydrophobic modification," and the like refer to the incorporation into the hydrophilic polymer structure of hydrophobic groups, wherein the hydrophobic group is an alkyl group having a chain length of about 4 to about 22 carbons. While these hydrophobically modified polymers have hydrophobic groups incorporated into the hydrophilic polymer structure, they should remain water-soluble. In several examples of the fifth embodiment, a mole ratio of a hydrophilic monomer to the hydrophobic compound in the hydrophobically modified polymer is from about 99.98:0.02 to about 90:10, wherein the hydrophilic monomer is a calculated amount present in the hydrophilic polymer. In several examples of the fifth embodiment, the hydrophobically modified polymers include a polymer backbone that includes polar heteroatoms. Generally, the polar heteroatoms present within the polymer backbone of the hydrophobically modified polymers include, but are not limited to, oxygen, nitrogen, sulfur, or phosphorous.

Exemplary hydrophobically modified polymers may contain a hydrophilic polymer backbone and a hydrophobic branch, wherein the hydrophobic branch includes an alkyl chain of about 4 to about 22 carbons. In several examples of the fifth embodiment, the hydrophobic branch is an alkyl group having a chain length of about 7 to about 22 carbons.

In several examples of the fifth embodiment, the hydrophobic branch is an alkyl group having a chain length of about 12 to about 18 carbons.

Examples of suitable hydrophobically modified polymers that may be utilized include acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another example of a suitable hydrophobically modified polymer includes an amino methacrylate/alkyl amino methacrylate copolymer. An example of a suitable amino methacrylate/alkyl amino methacrylate copolymer includes a dimethylaminoethyl methacrylate/alkyl-dimethylammoniumethyl methacrylate copolymer. An example of a suitable dimethylaminoethyl methacrylate/alkyl-dimethylammoniumethyl methacrylate copolymer includes a dimethylaminoethyl methacrylate/hexadecyl-dimethylammoniumethyl methacrylate copolymer. As discussed in more detail below, these copolymers may be formed, in several examples of the fifth embodiment, by reactions with a variety of alkyl halides. For example, in several examples of the fifth embodiment, the hydrophobically modified polymer includes a dimethylaminoethyl methacrylate/hexadecyl-dimethylammoniumethyl methacrylate bromide copolymer.

Exemplary hydrophobically modified polymers may be synthesized utilizing any suitable technique. For example, the hydrophobically modified polymers may be a reaction product of one or more hydrophilic polymers and one or more hydrophobic compounds. By way of further example, the hydrophobically modified polymers may be prepared from a polymerization reaction including a hydrophilic monomer and a hydrophobically modified hydrophilic monomer. In several examples of the fifth embodiment, the hydrophobically modified polymers may be pre-reacted before they are placed into the well bore. Alternatively, in exemplary embodiments, the hydrophobically modified polymers may be prepared by an appropriate in situ reaction. Suitable hydrophobically modified polymers and methods for their preparation are described in more detail in U.S. Pat. Nos. 6,476,169 and 7,117,942, the entire disclosures of which are incorporated herein by reference. Those of ordinary skill in the art, with the benefit of this disclosure, will be able to determine other suitable methods for the synthesis of suitable hydrophobically modified polymers.

In several examples of the fifth embodiment, suitable hydrophobically modified polymers may be synthesized by the hydrophobic modification of a hydrophilic polymer via reaction with a hydrophobic compound. As described above, hydrophobic modification refers to incorporation into the hydrophilic polymer structure of hydrophobic groups, wherein the hydrophobic group is an alkyl group having a chain length of from about 4 to about 22 carbons. The hydrophilic polymers suitable for forming the hydrophobically modified polymers should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and combinations thereof. Additional examples of alkyl acrylate polymers include polydimethylaminoethyl methacrylate, polydimethylaminopropyl methacrylamide, poly(acrylamide/dimethyl aminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethyl aminopropyl methacrylamide), poly(methacrylic acid/dimethylaminopropyl methacrylamide), and combinations thereof. In several examples of the fifth embodiment, the hydrophilic polymers include a polymer backbone and reactive amino groups in the polymer backbone or as pendant groups, the reactive amino groups capable of reacting with hydrophobic compounds. In several examples of the fifth embodiment, the hydrophilic polymers include dialkyl amino pendant groups. In several examples of the fifth embodiment, the hydrophilic polymers include a dimethyl amino pendant group and a monomer including dimethylaminoethyl methacrylate or dimethylaminopropyl methacrylamide. In several examples of the fifth embodiment, the hydrophilic polymers include a polymer backbone that includes polar heteroatoms, wherein the polar heteroatoms present within the polymer backbone of the hydrophilic polymers include oxygen, nitrogen, sulfur, or phosphorous. Suitable hydrophilic polymers that include polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and combinations thereof. In several examples of the fifth embodiment, the starch is a cationic starch. A suitable cationic starch may be formed by reacting a starch, such as corn, maize, waxy maize, potato, tapioca, or the like, with the reaction product of epichlorohydrin and trialkylamine.

In several examples of the fifth embodiment, the hydrophobic compounds that are capable of reacting with the hydrophilic polymers include alkyl halides, sulfonates, sulfates, organic acids, and organic acid derivatives. Examples of suitable organic acids and derivatives thereof include octenyl succinic acid; dodecenyl succinic acid; and anhydrides, esters, imides, and amides of octenyl succinic acid or dodecenyl succinic acid. In several examples of the fifth embodiment, the hydrophobic compounds are modified with an alkyl group having a chain length of from about 4 to about 22 carbons. In several examples of the fifth embodiment, the hydrophobic compounds are modified with an alkyl group having a chain length of from about 7 to about 22 carbons. In several examples of the fifth embodiment, the hydrophobic compounds have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the hydrophobic compounds is modified with an hydrophobic group that is an alkyl group having a chain length is from about 4 to about 22 carbons.

As previously mentioned, in several examples of the fifth embodiment, suitable hydrophobically modified polymers also may be prepared from a polymerization reaction including a hydrophilic monomer and a hydrophobically modified hydrophilic monomer. The hydrophobically modified polymers synthesized from the polymerization reactions have estimated molecular weights of from about 100,000 Daltons to about 10,000,000 Daltons and mole ratios of the hydrophilic monomer(s) to the hydrophobically modified hydrophilic monomer(s) of from about 99.98:0.02 to about 90:10.

A variety of hydrophilic monomers may be used to form the hydrophobically modified polymers. Examples of suitable hydrophilic monomers include acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, and combinations thereof.

In several examples of the fifth embodiment, a variety of hydrophobically modified hydrophilic monomers also may be used to form the hydrophobically modified polymers. Examples of suitable hydrophobically modified hydrophilic monomers include alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In several examples of the fifth embodiment, the alkyl groups have from about 7 to about 22 carbons. In several examples of the fifth embodiment, the alkyl groups have from about 12 to about 18 carbons. In several examples of the fifth embodiment, the hydrophobically modified hydrophilic monomer includes octadecyldimethylammoniumethyl methacrylate bromide, hexadecyldimethylammoniumethyl methacrylate bromide, hexadecyldimethyl ammoniumpropyl methacrylamide bromide, 2-ethylhexyl methacrylate, or hexadecyl methacrylamide.

In addition, water-soluble polymers suitable for use as relative permeability modifiers also may include hydrophilically modified polymers. As used in the fifth embodiment, the terms "hydrophilic modification," "hydrophilically modified," and the like refer to the incorporation into the hydrophilic polymer structure of hydrophilic groups, such as to introduce branching or to increase the degree of branching in the hydrophilic polymer. In several examples of the fifth embodiment, the hydrophilically modified polymers typically have molecular weights of from about 100,000 Daltons to about 10,000,000 Daltons. In several examples of the fifth embodiment, the hydrophilically modified polymers include a polymer backbone, the polymer backbone including polar heteroatoms. Generally, the polar heteroatoms present within the polymer backbone of the hydrophilically modified polymers include, but are not limited to, oxygen, nitrogen, sulfur, or phosphorous.

In several examples of the fifth embodiment, the hydrophilically modified polymers may be synthesized using any suitable method. In one example of the fifth embodiment, the hydrophilically modified polymers may be a reaction product of a hydrophilic polymer and a hydrophilic compound. In several examples of the fifth embodiment, suitable hydrophilically modified polymers may be formed by additional hydrophilic modification, for example, to introduce branching or to increase the degree of branching, of a hydrophilic polymer. Those of ordinary skill in the art, with the benefit of this disclosure, will be able to determine other suitable methods for the preparation of suitable hydrophilically modified polymers.

In several examples of the fifth embodiment, the hydrophilic polymers suitable for forming the hydrophilically modified polymers should be capable of reacting with hydrophilic compounds. In several examples of the fifth embodiment, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethyl aminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethyl aminopropyl methacrylamide), and poly (methacrylic acid/dimethyl aminopropyl methacrylamide). In several examples of the fifth embodiment, the hydrophilic polymers include a polymer backbone and reactive amino groups in the polymer backbone or as pendant groups, the reactive amino groups capable of reacting with hydrophilic compounds. In several examples of the fifth embodiment, the hydrophilic polymers include dialkyl amino pendant groups. In several examples of the fifth embodiment, the hydrophilic polymers include a dimethyl amino pendant group and at least one monomer including dimethylaminoethyl methacrylate or dimethylaminopropyl methacrylamide. In several examples of the fifth embodiment, the hydrophilic polymers include a polymer backbone including polar heteroatoms, wherein the polar heteroatoms present within the polymer backbone of the hydrophilic polymers include, but are not limited to, oxygen, nitrogen, sulfur, or phosphorous. Suitable hydrophilic polymers that include polar heteroatoms within the polymer backbone include homo-, co-, or terpolymers, such as, but not limited to, celluloses, chitosans, polyamides, polyetheramines, polyethyleneimines, polyhydroxyether amines, polylysines, polysulfones, gums, starches, and derivatives thereof. In several examples of the fifth embodiment, the starch is a cationic starch. A suitable cationic starch may be formed by reacting a starch, such as corn, maize, waxy maize, potato, tapioca, and the like, with the reaction product of epichlorohydrin and trialkylamine.

Hydrophilic compounds suitable for reaction with the hydrophilic polymers include: polyethers that include halogens; sulfonates; sulfates; organic acids; and organic acid derivatives. Examples of suitable polyethers include, but are not limited to, polyethylene oxides, polypropylene oxides, and polybutylene oxides, and copolymers, terpolymers, and mixtures thereof. In several examples of the fifth embodiment, the polyether includes an epichlorohydrin-terminated polyethylene oxide methyl ether.

In several examples of the fifth embodiment, the hydrophilically modified polymers formed from the reaction of a hydrophilic polymer with a hydrophilic compound have estimated molecular weights of from about 100,000 Daltons to about 10,000,000 Daltons and have weight ratios of the hydrophilic polymers to the polyethers of from about 1:1 to about 10:1. Examples of suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly (acrylamide/dimethylaminopropyl methacrylamide) and epichlorohydrin-terminated polyethyleneoxide methyl ether. In several examples of the fifth embodiment, the hydrophilically modified polymer includes the reaction product of a polydimethyl aminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Sixth Relative Permeability Modifiers Embodiment

In several examples of the sixth embodiment, the relative permeability modifier includes a water-soluble polymer including a hydrophilic polymer backbone that selectively reduces the effective permeability of at least a portion of a subterranean formation to aqueous-based fluids. As used in the sixth embodiment, the terms "hydrophobically modified," "hydrophobic modification," and the like refer to the incorporation into the hydrophilic polymer backbone of at least one hydrophobic group, wherein hydrophobic group is an alkyl group having a chain length of about 4 to about 22 carbons. As used in the sixth embodiment, the terms "cationically modified," "cationic modification," and the like refer to the incorporation of at least one cationic group or a cationic forming group that includes a short chain alkyl group, wherein the alkyl chain length is about 1 to about 3 carbons. As used in the sixth embodiment, the term "hydrophobically and cationically modified relative permeability modifier" refers to a relative permeability modifier that has both a hydrophobic modification and a cationic modification. One of the many potential advantages of the methods and compositions of the sixth embodiment herein is that the hydrophobically and cationically modified relative permeability modifiers may remain in solution at temperatures above 140° F. and pH's above 7.

In several examples of the sixth embodiment, the relative permeability modifier is a hydrophobically and cationically modified relative permeability modifier. In general, suitable hydrophobically and cationically modified relative permeability modifiers may be any of a variety of water soluble polymers that are both hydrophobically modified and cationically modified and are capable of selectively reducing the effective permeability of a formation to aqueous-based fluids without a comparable reduction of the formation's effective permeability to hydrocarbons. While the hydrophobically and cationically modified relative permeability modifiers suitable may have hydrophobic groups incorporated into the hydrophilic polymer structure, they should remain water soluble. As used in the sixth embodiment, "water soluble" refers to at least about 0.0001 weight percent soluble in water. In several examples of the sixth embodiment, the water-soluble polymer is at least about 0.45 weight percent soluble in distilled water at room temperature. In several examples of the sixth embodiment, the water-soluble polymer is at least about 0.6 weight percent soluble in distilled water at room temperature.

In several examples of the sixth embodiment, the hydrophobically and cationically modified relative permeability modifiers have a cationic charge as a result of a cationic modification. It should be noted that the cationic charge in the polymer is independent of the pH of the fluid including the relative permeability modifier. In other words, in some embodiments of the sixth embodiment, the cationic modification includes a quaternized nitrogen, and not a protonated amine as would be the case if an amine is contacted with a Bronsted acid or a Lewis acid reacted amine Therefore, the cationic charge is not because of the acidification or protonation of an amine. Furthermore, it is believed that the incorporation of a cationic modification into the hydrophilic polymer structure increases the charge of the hydrophobically and cationically modified relative permeability modifier, allowing these compounds to remain in solution at temperatures above 140° F. and pH's above 7.

Examples of hydrophobically and cationically modified relative permeability modifiers include a hydrophilic polymer backbone, at least one hydrophobic modification, and at least one cationic modification. In several examples of the sixth embodiment, the hydrophobic modification includes a hydrophobic branch including an alkyl chain of about 4 to about 22 carbons and the cationic modification includes a cationic group or cationic forming group including an alkyl chain of about 1 to about 3 carbons. In several examples of the sixth embodiment, the hydrophobic branch is an alkyl group having a an alkyl chain length of about 7 to about 22 carbons. In certain embodiments, the hydrophobic branch is an alkyl group having a an alkyl chain length of about 12 to about 18 carbons. In several examples of the sixth embodiment, the cationic group or cationic forming group may have an alkyl group having a chain length of about 1, 2, or 3 carbons. In several examples of the sixth embodiment, the hydrophobically and cationically modified relative permeability modifiers include a polymer backbone that includes polar heteroatoms. Generally, the polar heteroatoms present within the polymer backbone of the hydrophobically and cationically modified relative permeability modifiers include, but are not limited to, oxygen, nitrogen, sulfur, or phosphorous.

In several examples of the sixth embodiment, hydrophobically and cationically modified relative permeability modifiers suitable for use may be synthesized utilizing any suitable technique. In several examples of the sixth embodiment, suitable hydrophobically and cationically modified relative permeability modifiers may be synthesized by the hydrophobic modification and the cationic modification of a hydrophilic polymer via a reaction with a hydrophobic compound and a cationic compound. According to the sixth embodiment, the term "cationic compound" includes not only cationic compounds, but cationic forming compounds. For example, in several examples of the sixth embodiment, suitable hydrophobically and cationically modified relative permeability modifiers may be a reaction product of a reaction including a hydrophilic polymer, a hydrophobic compound, and a cationic compound. In several examples of the sixth embodiment, the hydrophobically and cationically modified relative permeability modifiers may be prepared by reacting a reaction product formed from a reaction of a hydrophilic polymer with a hydrophobic compound. In several examples of the sixth embodiment, the hydrophobically and cationically modified relative permeability modifiers may be prepared by reacting a hydrophobic compound with a reaction product formed from a reaction of a hydrophilic polymer with a cationic compound. In several examples of the sixth embodiment, the hydrophobically and cationically modified relative permeability modifiers may be prepared from a polymerization reaction including a hydrophilic monomer, a hydrophobically modified hydrophilic monomer, and a cationic monomer. In several examples of the sixth embodiment, the hydrophobically and cationically modified relative permeability modifiers may be pre-reacted before they are placed into the well bore. Alternatively, in several examples of the sixth embodiment, the hydrophobically and cationically modified relative permeability modifiers may be prepared by an appropriate in situ reaction. Hydrophobically modified polymers and methods for their preparation are described in more detail in U.S. Pat. Nos. 6,476,169 and 7,117,942, the disclosures of which are hereby incorporated herein by reference. Those of ordinary skill in the art, with the benefit of this disclosure, will be able to determine other suitable methods for the synthesis of suitable hydrophobically and cationically modified relative permeability modifiers.

As mentioned above, in several examples of the sixth embodiment, hydrophobically and cationically modified relative permeability modifiers suitable for use may be synthesized by the reaction of a hydrophilic polymer with a hydrophobic compound and a cationic compound. In several examples of the sixth embodiment, hydrophilic polymers suitable for forming the hydrophobically and cationically modified relative permeability modifiers should be capable of reacting with hydrophobic compounds and cationic compounds. Examples of suitable hydrophilic polymers include, homo-, co-, or terpolymers such as, but not limited to, polyacrylamides, polyvinylamines, poly(vinylamines/vinyl alcohols), alkyl acrylate polymers, alkylamino acrylate or alkylamino alkylacrylate polymers in general, and combinations thereof. Additional examples of alkyl acrylate polymers, polyacrylamides, and alkylamino acrylate polymers and alkylaminoalkyl acrylate polymers include polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), poly(methacrylic acid/dimethylaminopropyl methacrylamide), and combinations thereof.

In several examples of the sixth embodiment, a hydrophilic polymer suitable for use includes a polymer backbone that contains a reactive amino group in the polymer backbone or as a pendant group, wherein the reactive amino group is capable of reacting with a hydrophobic compound and/or a cationic compound. In several examples of the sixth embodiment, a suitable hydrophilic polymer includes a dialkyl amino pendant group. In several examples of the sixth embodiment, a suitable hydrophilic polymer includes a dimethyl amino pendant group and a monomer including dimethylaminoethyl methacrylate or dimethylaminopropyl methacrylamide. In several examples of the sixth embodiment, a suitable hydrophilic polymer may be formed from monomers containing amine groups in about 20-100 mole % of the monomers. In several examples of the sixth embodiment, a suitable hydrophilic polymer includes a polymer backbone including polar heteroatoms, wherein the polar heteroatoms present within the polymer backbone of the hydrophilic polymer includes oxygen, nitrogen, sulfur, or phosphorous. Suitable hydrophilic polymers that include polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and combinations thereof. In several examples of the fifth embodiment, the starch is a cationic starch. A suitable cationic starch may be formed by reacting a starch, such as corn, maize, waxy maize, potato, tapioca, or the like, with the reaction product of epichlorohydrin and trialkylamine.

In several examples of the sixth embodiment, suitable hydrophobic compounds that are capable of reacting with the hydrophilic polymers include alcohols, amines, epoxides, alkyl halides, sulfonates, sulfates, organic acids, and organic acid derivatives that include an alkyl chain having a chain length of from about 4 to about 22 carbons. Examples of suitable organic acids and derivatives thereof include, but are not limited to, acid anhydrides, esters, imides, acid halides and amides of carboxylic acids that include an alkyl chain having a chain length of from about 4 to about 22 carbons. In several examples of the sixth embodiment, the hydrophobic compounds are modified with an alkyl chain having a chain length of from about 7 to about 22 carbons.

In several examples of the sixth embodiment, the hydrophobic compounds are modified with an alkyl chain having a chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the hydrophobic compound contains a hydrophobic group that is an alkyl group having a chain length of from about 4 to about 22 carbons.

Suitable cationic compounds that are capable of reacting with the hydrophilic polymers include alcohols, amines, epoxides, alkyl halides, sulfonates, sulfates, organic acids, and organic acid derivatives that include an alkyl chain length of from about 1 to about 3 carbons. Examples of suitable organic acids and derivatives thereof include, but are not limited to, acid anhydrides, esters, imides, acid halides and amides of carboxylic acids that include an alkyl chain length of from about 1 to about 3 carbons. In several examples of the sixth embodiment, the cationic compounds have an alkyl chain length of 1, 2, or 3 carbons. For example, where the cationic compound is an alkyl halide, the reaction between the cationic compound and hydrophilic polymer may result in the quaternization of at least some of the hydrophilic polymer amino groups with an alkyl halide, wherein the alkyl chain length is from about 1 to about 3 carbons. Additional examples of suitable cationic compounds include aminoethyltrimethylammonium halides, 2-chloro- or 2-bromoethyl trimethyl ammonium halide, 3-chloro- or 3-bromopropyl trimethylammonium halide and a reaction product of trialkylamine, for example trimethylamine, with epichlorohydrin.

In several examples of the sixth embodiment, a cationic modification and/or a hydrophobic modification may be incorporated into the hydrophilic polymer backbone by quaternizing amine groups located in the hydrophilic polymer backbone. In several examples of the sixth embodiment, hydrophobic compounds may be present in the hydrophilic polymer structure in an amount sufficient to quaternize up to and including about 10% of the amine groups. In several examples of the sixth embodiment, hydrophobic compounds may be present in the hydrophilic polymer structure in an amount sufficient to quaternize about 1% to about 5% of the amine groups. In several examples of the sixth embodiment, cationic compounds may be present in the hydrophilic polymer structure in an amount sufficient to quaternize up to and including about 50% of the amine groups. In several examples of the sixth embodiment, the cationic compounds may be present in the hydrophilic polymer structure in an amount sufficient to quaternize about 1% to about 20% of the amine groups. In several examples of the sixth embodiment, the cationic compounds may be present in the hydrophilic polymer structure in an amount sufficient to quaternize about 5% to about 10% of the amine groups.

Additional examples of suitable hydrophobically and cationically modified relative permeability modifiers include a polymer that has been hydrophobically modified with an alkyl group present on an amino group (in the polymer backbone or as a pendant group) in quaternized form and has been cationically modified with an alkyl group present on an amino group (in the polymer backbone or as a pendant group) in quaternized form. For example, an alkyl group may be present on a dialkyl amino pendant group in quaternized form. In several examples of the sixth embodiment, the dialkyl amino pendant group includes a dimethyl amino pendant group. One specific example of a hydrophobically and cationically modified relative permeability modifier includes a poly(dimethylaminoethylmethacrylate) or poly (dimethylaminopropyl methacrylamide) that has been hydrophobically modified with an alkyl group with 4 carbons to 22 carbons (e.g., 4 carbons, 6, carbons, 8 carbons, 10 carbons, 12 carbons, 14 carbons, 16 carbons, 18 carbons, 20 carbons, 22 carbons, etc.) on a dimethylamino group and has been cationically modified with an alkyl group with 1 to 3 carbons on another dimethylamino group.

As previously mentioned, in examples of the sixth embodiment, suitable hydrophobically and cationically modified relative permeability modifiers also may be prepared from a polymerization reaction including a hydrophilic monomer, a hydrophobically modified hydrophilic monomer, and a cationic monomer. In several examples of the sixth embodiment, suitable hydrophobically and cationically modified relative permeability modifiers may be prepared by first polymerizing a hydrophilic polymer and a hydrophobically modified hydrophilic monomer, and then reacting the resulting polymer with cationic compound or a cationic monomer. In several examples of the sixth embodiment, suitable hydrophobically and cationically modified relative permeability modifiers may also be prepared by first polymerizing a hydrophilic monomer and cationic monomer, and then reacting the resulting polymer with a hydrophobic compound or hydrophobic monomer. Suitable hydrophobically and cationically modified relative permeability modifiers synthesized from the polymerization reactions may have estimated molecular weights of from about 100,000 Daltons to about 10,000,000 Daltons. In several examples of the sixth embodiment, the mole ratios of the hydrophilic monomer(s) to the hydrophobically modified hydrophilic monomer(s) and the cationically modified hydrophilic monomer(s) may be from about 99.98:0.02 to 90:10.

A variety of hydrophilic monomers may be used to form the hydrophobically and cationically modified relative permeability modifiers. Examples of suitable hydrophilic monomers include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, methacrylamide, hydroxyethyl acrylate, vinyl sulfonic acid, vinyl phosphonic acid, methacrylic acid, vinyl caprolactam, N-vinylformamide, N,N-diallylacetamide, itaconic acid, and styrene sulfonic acid, and combinations thereof.

A variety of hydrophobically modified hydrophilic monomers also may be used to form the hydrophobically and cationically modified relative permeability modifiers. Examples of suitable hydrophobically modified hydrophilic monomers include, but are not limited to, alkyl acrylates, alkyl methacrylates, alkyl acrylamides, alkyl methacrylamides, wherein the alkyl groups have from about 4 to about 22 carbon atoms. In several examples of the sixth embodiment, the alkyl groups have from about 7 to about 22 carbons. In several examples of the sixth embodiment, the alkyl groups have from about 12 to about 18 carbons. In several examples of the sixth embodiment, the hydrophobically modified hydrophilic monomer includes 2-ethylhexyl methacrylate, or hexadecyl methacrylamide. In several examples of the sixth embodiment, the hydrophobically modified hydrophilic monomers may be cationic. Examples of cationic hydrophobically modified hydrophilic monomers include, alkyl dimethylammoniumethyl methacrylate halides, and alkyl dimethylammoniumpropyl methacrylamide halides. Specific examples of such monomers include, octadecyldimethyl ammoniumethyl methacrylate bromide, hexadecyldimethyl ammoniumethyl methacrylate bromide, and hexadecyldimethyl ammoniumpropyl methacrylamide bromide.

A variety of cationic monomers also may be used to form the hydrophobically and cationically modified relative permeability modifiers. Examples of suitable cationic monomers include, but are not limited to, dimethyldiallyl ammonium halide, trimethyl ammoniumethyl methacrylate halide, trimethylammoniumpropyl methacrylamide halide, methacrylamidoethyltrimethyl ammonium halide, quaternary salt derivatives of acrylamide and quaternary salt derivatives of acrylic acid and combinations thereof.

In several examples of the sixth embodiment, the mole ratio of cationic modifications to hydrophobic modifications present in the hydrophobically and cationically modified relative permeability modifiers is from about 1:1 to about 50:1. In several examples of the sixth embodiment, the mole ratio of cationic modifications to hydrophobic modifications present in the hydrophobically and cationically modified relative permeability modifiers is from about 2:1 to about 20:1. In several examples of the sixth embodiment, the mole ratio of cationic modifications to hydrophobic modifications present in the hydrophobically and cationically modified relative permeability modifiers is from about 5:1 to about 10:1.

Examples of suitable hydrophobically and cationically modified relative permeability modifiers that may be utilized include, but are not limited to: an acrylamide/octadecyldimethylammoniumethyl methacrylate bromide/trimethylammonium propylmethacrylamide terpolymer, a dimethylpropylammoniumethylmethacrylate/vinyl pyrrolidone/hexadecyldimethylammoniumethyl methacrylate bromide terpolymer, an aminoalkyl methacrylate/trialkyl ammonium alkyl methacrylate halide terpolymer, including a dimethylaminoethyl methacrylate/alkyldimethylammoniumethyl methacrylate/trialkylammoniumethyl methacrylate halide terpolymer and a dimethylaminoethyl methacrylate/hexadecyldimethylammoniumethyl methacrylate/dimethylpropylethyl methacrylate bromide terpolymer.

In several examples of the sixth embodiment, hydrophobically and cationically modified relative permeability modifiers may be present in a permeability modifying fluid introduced into a subterranean formation. Treatment fluids including hydrophobically and cationically modified relative permeability modifiers will be referred to herein as "permeability modifying fluids." Sufficient concentrations of hydrophobically and cationically modified relative permeability modifiers should be present in these permeability modifying fluids to provide the desired level of permeability modification. In several examples of the sixth embodiment, hydrophobically and cationically modified relative permeability modifiers are present in these permeability modifying fluids in an amount of from about 0.02% to about 10% by weight of the permeability modifying fluid. In several examples of the sixth embodiment, hydrophobically and cationically modified relative permeability modifiers present in these permeability modifying fluids in an amount of from about 0.05% to about 1.0% by weight of the permeability modifying fluid. In several examples of the sixth embodiment, hydrophobically and cationically modified relative permeability modifiers are provided in a concentrated aqueous solution prior to its combination with the other components necessary to form the permeability modifying fluids.

In several exemplary embodiments, the relative permeability modifier is present in the treatment fluid in an amount of from about 0.05% to about 2% or from about 1% to about 1.5% weight by volume of the first treatment fluid. It is understood the amount of polymer introduced into each interval, including the first, second, third, fourth, fifth, and sixth amount of polymer, is independently selected from this range and can be the same or different.

In several exemplary embodiments, the method includes introducing a proppant composition into the interval and the at least one fracture in the subterranean formation, the proppant composition including a proppant and a carrier fluid. In several exemplary embodiments, the proppant can be any proppant of any size known in the art. Suitable proppants include graded sand, bauxite, ceramic materials, glass materials, walnut hulls, polymer beads, and the like. Suitable sizes include proppants having a longest dimension of about 10 nm to about 1 mm. It is understood that the proppant introduced into each interval, including the first, second, third, fourth, fifth, and sixth proppant, can be the same or different.

In several exemplary embodiments, the carrier fluid is a fluid having a density that is close to that of the proppant. Suitable carrier fluids include fresh water, water having a pH of from about 4 to about 8, salt water (e.g., water containing one or more salts, such as potassium chloride, dissolved therein), brine (e.g., saturated salt water), seawater, or hydrocarbons, such as kerosene, diesel oil, crude oil or methane. It is understood the carrier fluid introduced into each interval, including the first, second, third, fourth, fifth, and sixth carrier fluid, can be the same or different.

In several exemplary embodiments, the treatment fluid or proppant composition can include a gelling additive, including a gelling agent. In several exemplary embodiments, a suitable gelling agent can be, for example, a galactomannan gelling agent. Suitable galactomannan gelling agents include naturally occurring gums and their derivatives, such as guar, locust bean, tara, honey locust, tamarind, karaya, tragacanth, carrageenan, and the like. These gums are generally characterized as including a linear backbone having various amounts of galactose units attached thereto. The gums also can be characterized as including one or more functional groups, such as cis-hydroxyl, hydroxyl, carboxyl, sulfate, sulfonate, amino, or amide. In an exemplary embodiment, the gelling agents suitable for use in the treatment fluid or proppant composition include at least one or more of guar, hydroxyethylguar, hydroxypropylguar, carboxymethylguar, carboxymethylhydroxyethylguar, and carboxymethyl hydroxypropylguar.

In several exemplary embodiments, the treatment fluid or proppant composition are gelled when one or more of the above-mentioned galactomannan gelling agents is dissolved in the treatment fluid or proppant composition to form a suitable viscous aqueous gel. In several exemplary embodiments, the galactomannan gelling agent or agents may be present in the treatment fluid or proppant composition in a sufficient amount to provide the desired gelling of the treatment fluid or proppant composition.

As will be understood by those skilled in the art, a variety of conventional additives can be included in the treatment fluid and proppant composition, such as gel stabilizers, gel breakers, clay stabilizers, bactericides, fluid loss additives, and the like, which do not adversely react with the stimulation fluids or prevent their use in a desired manner.

While the present invention has been described in terms of certain embodiments, those of ordinary skill in the art will recognize that the invention can be practiced with modification within the spirit and scope of the appended claims.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

The following examples are illustrative of the compositions and methods discussed above.

Examples

An interval of interest would be perforated and then isolated. Typically this step would start from the farthest portion of the horizontal well bore. A relative permeability modifier (RPM) would be included in a treatment fluid, such as a pad fluid. This pad fluid would be injected into the perforated interval at an injection rate to generate a pressure above the fracture gradient, which would create at least one fracture and fracture face in the subterranean formation. This would allow a pad fluid containing an RPM to penetrate the subterranean formation adjacent to and along the fracture face(s). Following the injection of the pad fluid stage, a proppant composition (proppant slurry), starting at low proppant concentration, would be injected into the fracture at the same injection rate as the pad fluid stage to place the proppant into the created fracture. Following the injection of the proppant composition, a displacement fluid would be injected into the well bore to displace the proppant slurry from the well bore to the top perforation of the perforated interval.

The described process above would be repeated for each interval or a majority of intervals to achieve the number fracturing stages designed.

While the present invention has been described in terms of certain embodiments, those of ordinary skill in the art will recognize that the invention can be practiced with modification within the spirit and scope of the appended claims.

The present disclosure has been described relative to certain embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of reducing water passage from a first interval to a second interval in a well bore penetrating a subterranean formation during hydraulic fracturing of the first interval, comprising:
   isolating the first interval;
   treating the first interval by:
      introducing a treatment fluid into the first interval at a first pressure sufficient to create or enhance a fracture and a fracture face in the first interval, wherein the treatment fluid comprises an aqueous fluid and a relative permeability modifier; and
      allowing the treatment fluid to penetrate the subterranean formation along the fracture and the fracture face of the first interval; and
   after treating the first interval, introducing a proppant composition into the fracture in the first interval, the proppant composition comprising a proppant and a carrier fluid;

wherein the second interval comprises proppant, the second interval being located at a distance of from about 15 meters to about 180 meters from the first interval and being connected to the first interval by a fluid channel formed during hydraulic fracturing of the first interval; and wherein treating the first interval with the treatment fluid reduces passage of the aqueous fluid or the carrier fluid through the fluid channel from the first interval to the second interval.

2. The method of claim 1, further comprising repeating each step for three or more intervals, wherein each interval is connected to at least one other interval by at least one fluid channel.

3. The method of claim 1, wherein the relative permeability modifier is present in the treatment fluid in an amount of from about 0.05% to about 2% weight by volume of the treatment fluid.

4. The method of claim 1, wherein the treatment fluid further comprises a gelling agent.

5. A method of reducing water passage between a first interval in a first well bore and a second interval in a second well bore during hydraulic fracturing, comprising:
   isolating the first interval in the first well bore;
   treating the first interval by introducing a first treatment fluid into the first interval at a first pressure sufficient to create or enhance a first fracture and a first fracture face, wherein the first treatment fluid comprises a first aqueous fluid and a first relative permeability modifier; and
   after the first interval has been treated, introducing a first proppant into the first fracture;
   after the first interval has been treated, isolating the second interval in the second well bore and;
   treating the second interval by introducing a second treatment fluid into the second interval at a second pressure sufficient to create or enhance a fracture in the second interval;
   wherein the first and second well bores are separated by a distance from about 100 meters to about 5,000 meters and are connected by a fluid channel formed during hydraulic fracturing of the second interval; and
   wherein treating the first interval with the treatment fluid reduces water passage through the fluid channel from the first interval to the second interval.

6. The method of claim 5, wherein the second treatment fluid comprises a second relative permeability modifier.

7. The method of claim 6, wherein the first relative permeability modifier is present in the first treatment fluid in a first amount of from about 0.05% to about 2% weight by volume of the first treatment fluid, and
   wherein the second relative permeability modifier is present in the second treatment fluid in a second amount of from about 0.05% to about 2% weight by volume of the second treatment fluid.

8. The method of claim 5, further comprising repeating each step for three or more intervals in at least one of the first or second well bores wherein each interval is connected to at least one other interval by a fluid channel.

9. The method of claim 5, wherein the first treatment fluid and the second treatment fluid each independently further comprise a gelling agent.

10. A method of reducing water passage during hydraulic fracturing comprising:
    isolating a first interval in a first well bore;
    treating the first interval by:
      introducing a treatment fluid comprising a first relative permeability modifier into the first interval at a pressure sufficient to create or enhance a first fracture and a first fracture face
      allowing the treatment fluid to penetrate along the first fracture and the first fracture face; and
      introducing a proppant into the first fracture; and after treating the first interval, treating a second interval in a second well bore by:
      introducing a second treatment fluid into the second interval at a pressure sufficient to create or enhance a fracture in the second interval; and
    wherein the first interval is connected to the second interval by a fluid channel that is formed during hydraulic fracturing of the first interval; and a distance between the first well bore and the second well bore is from about 100 meters to about 5,000 meters; and
    wherein treating the first interval with the treatment fluid reduces water passage through the fluid channel between the first interval and the second interval.

11. The method of claim 10, wherein the first interval has already been fractured, completed, or has begun producing when the second interval is treated.

12. The method of claim 10, wherein the first relative permeability modifier is present in the treatment fluid in an amount of from about 0.05% to about 2% weight by volume of the treatment fluid.

* * * * *